(12) United States Patent
Hujisawa et al.

(10) Patent No.: US 6,502,866 B1
(45) Date of Patent: Jan. 7, 2003

(54) ONE-TOUCH JOINT FOR FLEXIBLE TUBE

(75) Inventors: Syouzou Hujisawa, Osaka-fu (JP); Junichi Kuratani, Amagasaki (JP); Toshio Sibabuti, Osaka (JP); Mikio Nakaoka, Osaka (JP); Kazuyoshi Kariki, Osaka (JP)

(73) Assignees: Osaka Gas Co., Ltd., Osaka (JP); Sinwa Sangyo Co., Ltd., Osaka (JP)

( * ) Notice: Subject to any disclaimer, the term of this patent is extended or adjusted under 35 U.S.C. 154(b) by 0 days.

(21) Appl. No.: 09/495,529

(22) Filed: Jan. 31, 2000

(30) Foreign Application Priority Data

May 26, 1999 (JP) ............................................ 11-145719
Jun. 28, 1999 (JP) ............................................ 11-180980
Jul. 27, 1999 (JP) ............................................ 11-211442

(51) Int. Cl.$^7$ ................................................. F16L 37/18
(52) U.S. Cl. ........................ 285/249; 285/903; 285/93; 285/246
(58) Field of Search .................... 285/903, 249, 285/246, 247, 248, 340, 222.1, 93, 94, 322

(56) References Cited

U.S. PATENT DOCUMENTS

| | | | | |
|---|---|---|---|---|
| 2,363,586 A | * | 11/1944 | Guarnaschelli | 285/903 |
| 2,503,169 A | * | 4/1950 | Phillips | 285/903 |
| 5,261,707 A | * | 11/1993 | Kotake et al. | 285/903 |
| 5,267,877 A | | 12/1993 | Scannelli et al. | |
| 5,292,156 A | * | 3/1994 | Sasa et al. | 285/322 |
| 5,415,436 A | * | 5/1995 | Claes et al. | 285/903 |
| 5,423,578 A | * | 6/1995 | Kanomata et al. | 285/903 |
| 5,441,312 A | * | 8/1995 | Fujiyoshi et al. | 285/903 |
| 6,079,749 A | * | 6/2000 | Albino et al. | 285/23 |

FOREIGN PATENT DOCUMENTS

| | | | |
|---|---|---|---|
| DE | 4334529 | * 4/1994 | ................. 285/903 |
| JP | 60-208689 | 10/1985 | |
| JP | 7-174276 | 7/1991 | |
| JP | 3-80187 | 8/1991 | |
| JP | 3-194286 | 8/1991 | |
| JP | 3-100687 | 10/1991 | |
| JP | 3-104590 | 10/1991 | |
| JP | 3-125982 | 12/1991 | |
| JP | 4-66488 | 6/1992 | |
| JP | 4-117986 | 10/1992 | |
| JP | 5-34385 | 5/1993 | |
| JP | 5-38487 | 5/1993 | |
| JP | 5-96680 | 12/1993 | |
| JP | 6-58476 | 3/1994 | |
| JP | 6-281071 | 10/1994 | |
| JP | 6-335141 | 11/1994 | |
| JP | 7-103379 | 4/1995 | |
| JP | 7-233889 | 9/1995 | |
| JP | 8-2401293 | 9/1996 | |
| JP | 9-152080 | 6/1997 | |
| JP | 10-246373 | 9/1998 | |

* cited by examiner

Primary Examiner—Eric K. Nicholson
(74) Attorney, Agent, or Firm—Fildes & Outland, P.C.

(57) ABSTRACT

A one-touch joint for a flexible tube. A tapered surface is formed on the inner circumference of a fastening ring, and a ring-shaped retainer is positioned between the tapered surface and a seal member. When the flexible tube is inserted into the retainer, projections in the retainer are pushed open elastically by peak sections of a corrugated tube, and when a peak section has passed, the projections engage with a valley section of the corrugated tube. The joint and flexible tube can be coupled in a one-touch operation, simply by inserting the flexible tube. Moreover, excellent sealing properties and detachment prevention properties are obtained between the joint and the flexible tube.

27 Claims, 16 Drawing Sheets

ONE-TOUCH JOINT FOR FLEXIBLE TUBE

FIELD OF THE INVENTION

The present invention relates to a one-touch joint for a flexible tube, and more particularly, to a one-touch joint for a flexible tube, wherein said flexible tube is constituted by a corrugated tube used in gas piping, or the like.

BACKGROUND OF THE INVENTION

A conventional joint for a flexible tube of this kind is disclosed, for example, in JP-A-8-159350, which describes a joint comprising: a metal tubular main body having a contact surface on the inner side thereof; a metal push ring, the end portion of which screws inside said tubular main body, in a state where a flexible tube in which a covering member is removed from several peak sections at the front end of a corrugated tube has been inserted through the push ring; and a retainer, installed at the front end of the push ring, and having metal projecting sections which are capable of engaging with the valley sections on the outer surface of the corrugated tube in the flexible tube inserted through the push ring.

In a joint for a flexible tube of this kind, by inserting the flexible tube into the push ring in a state where the push ring has provisionally been screwed loosely into the tubular main portion, the peak section at the end of the flexible tube pushes open the projecting sections of the retainer and passes by the position of these projecting sections. Thereby, when the front end of the corrugated tube projects from the end of the retainer by a prescribed amount, the projecting sections in the retainer engage with a valley section of the corrugated tube. Thereupon, by subsequently screwing in the push ring further, the end portion of the corrugated tube projecting from the end of the retainer is pressed and squeezed tightly between the projecting sections of the retainer and the contact surface of the tubular main body.

Accordingly, the flexible tube is connected to the joint in a sealed state, a seal being achieved by the squeezing of the corrugated tube by the metal sections, and hence the seal region is fire-resistant. Moreover, since the end portion of the corrugated tube is held between the projecting sections of the retainer and the contact surface of the tubular main body, this has the effect of preventing the corrugated tube from becoming detached.

However, in this joint described in JP-A-8-159350, as described above, it is necessary to perform the operation of further screwing in the push ring after the flexible tube has been inserted, and moreover, since the end portion of the corrugated tube must be pressed and squeezed as a result of this screwing operation, a relatively large amount of force is required to perform this screwing operation.

SUMMARY OF THE INVENTION

The present invention resolves these problems, an object thereof being to make it possible to connect a joint and a tube in a one-touch operation, simply by inserting a flexible tube into a joint, whilst also preventing detachment of the joint and the flexible tube, and achieving good sealing characteristics, and fire-resistant properties in the seal section.

In order to achieve this object, the one-touch joint for a flexible tube composed of a corrugated tube according to the present invention comprises: a tubular main body; a fastening ring, the front end portion of which screws inside the tubular main body, a tapered surface expanding in diameter towards the front end thereof being formed on the inner circumference of the fastening ring; a ring-shaped seal member provided inside the tubular main body; and a ring-shaped retainer located inside the tubular main body, between the tapered surface of the fastening ring and the seal member; wherein the corrugated tube of the flexible tube, the corrugated tube comprising a plurality of peak sections and valley sections, can be inserted from the end portion of the fastening ring to the inside of the fastening ring and the inside of the retainer and seal member provided in the tubular main body; and the retainer comprises: projections which project in inward radial directions at one end of the retainer; an outer circumferential surface capable of contacting the tapered surface on the inner side of the fastening ring, formed at the other end of the retainer; incisions formed in an axial direction from the one end towards the other end, in a plurality of positions along the circumference of the retainer; and a thin section, formed at the other end of the retainer, for the purpose of allowing deformation whereby the projections are pushed open elastically by a peak section of the corrugated tube when the corrugated tube is inserted into the retainer, and the projections engage with a valley section of the corrugated tube when the peak section has passed.

By adopting this composition, the flexible tube and the joint can be coupled together securely in a sealed state by means of a one-touch operation which involves simply inserting the flexible tube into the joint, without requiring any other operations, such as screwing in of members, or the like.

If a force acting to detach the flexible tube from the joint is applied thereto, the outer circumference of the retainer is pressed against the tapered surface on the inner circumference of the fastening ring, generating a reactive force acting in an inward radial direction on the projecting sections, and due to this force the projecting sections engage strongly with the valley section of the corrugated tube, thereby preventing detachment of the flexible tube.

DESCRIPTION OF THE PREFERRED EMBODIMENTS

Figure 1:
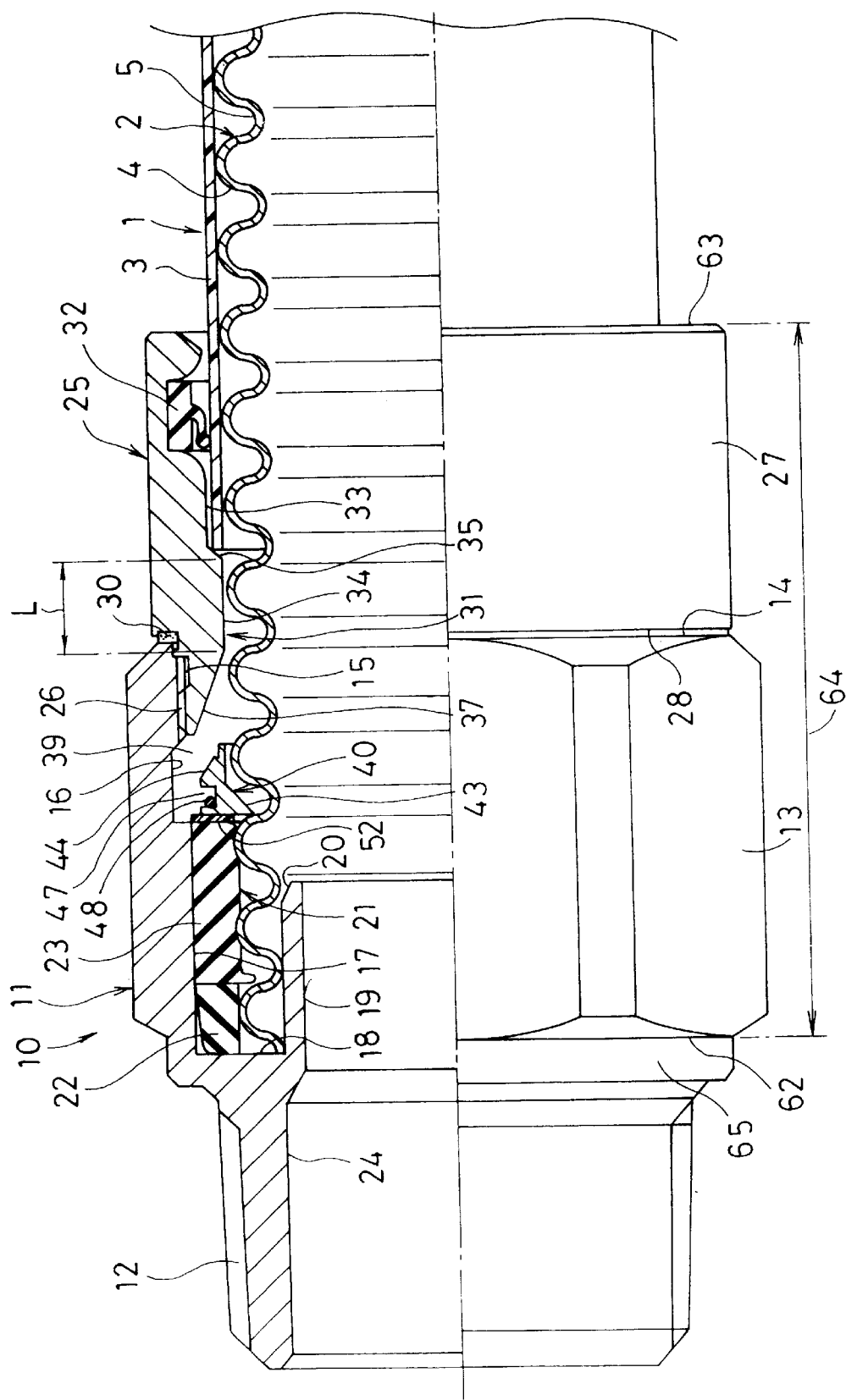
FIG. 1 is a diagram showing a portion of a one-touch joint for a flexible tube according to an embodiment of the present invention.
Figure 2:
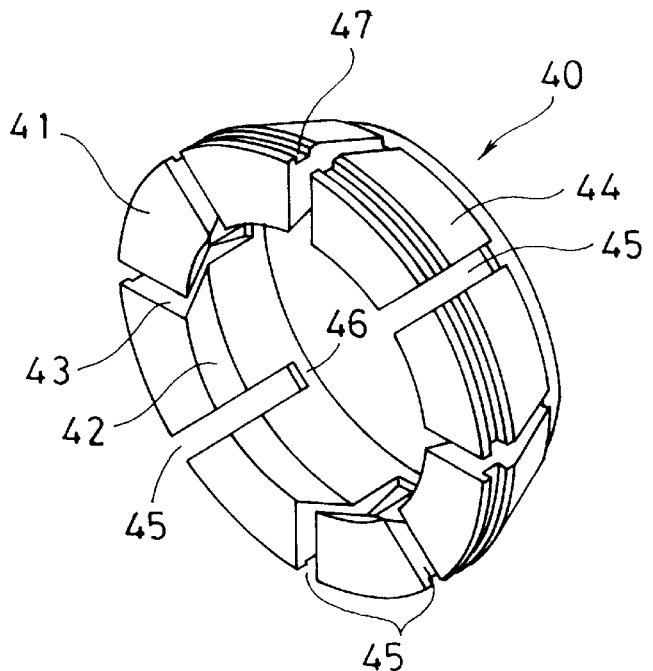
FIG. 2 is an oblique view of a retainer in FIG. 1.
Figure 3:
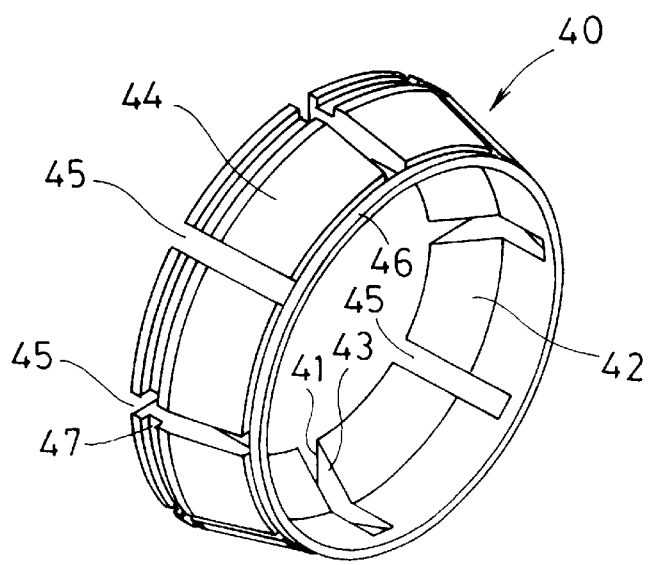
FIG. 3 is a further oblique view of the retainer.
Figure 4:
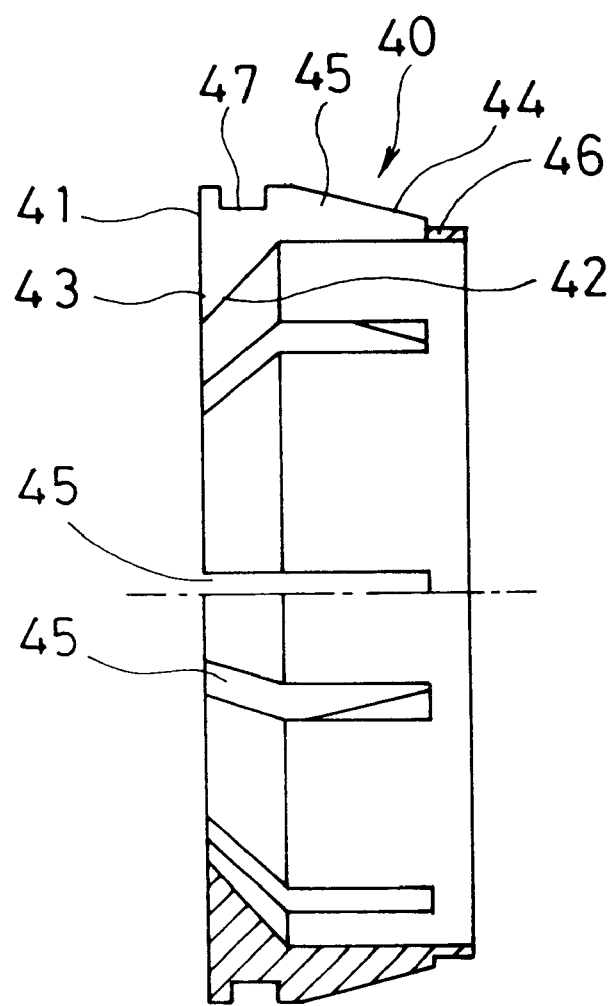
FIG. 4 is a sectional view of the retainer.

In FIG. 1, numeral 1 denotes a corrugated tube, which is constituted by a thin stainless steel corrugated tube 2 and a tube-shaped covering member 3 made from resin, which covers the outer circumference of the corrugated tube 2. In the corrugated tube 2, 4 denotes a peak section and 5 denotes a valley section. This flexible tube 1 is connected to a joint 10 according to the present invention in a state where the covering member 3 has been removed for a length of several peak sections at the end of the corrugated tube 2.

In the joint 10, numeral 11 denotes a tubular main body, made from a metal such as brass, or the like, and by forming an external screw section 12 at one end thereof, it is composed in such a manner that it can be connected to a desired member, such as a gas pipe, or the like. Numeral 13 denotes a hexagonal section, which is used for screwing in the external screw section 12. Numeral 14 denotes the other end face of the hexagonal section 13.

On the inner circumference of the tubular main body 11, there are formed, in order from the opening at the other end thereof, an internal screw section 15, an inner circumferential surface 16 having a diameter equal to or slightly larger than the inner diameter of the valley regions of the internal screw section 15, a ring-shaped seal member receiving section 17 having a diameter smaller than the inner circumferential surface 16, and a rear end face 18 of the seal member receiving section 17. A ring-shaped rubber seal member 21 is held in a state of light pressure in the seal member receiving section 17. This seal member 21 is constituted by a fire-resistant section 22 located at the rear side of the tubular main body 11, and a normal rubber section 23 located towards the opening on the tubular main body 11 from this fire-resistant section 22, the two sections 22 and 23 forming an integrated body in the axial direction thereof.

The rear end face 18 is formed in the direction of the diameter of the tubular main body 11, running towards the inside from the seal member 21. A ring-shaped projecting section 19 is formed in connection with the end of the inner side of the rear end face 18. This ring-shaped projecting section 19 is formed in such a manner that it projects from the rear end face 18 in an axial direction towards the opening at one end of the tubular main body 11, in a position corresponding to the seal holding section 17 running in the axial direction and a position to the inner side of the seal member 21 accommodated in the seal member receiving section 17. Furthermore, as shown in the diagram, the ring-shaped projecting section 19 is composed in such a manner that when the corrugated tube 2 is inserted inside the seal member 21, it enters inside the corrugated tube 2 without a large gap being formed therebetween. A tapered surface 20 is formed on the outer side of the end face of the ring-shaped projecting section 19. A through hole 24, forming a fluid passage from the inner side of the ring-shaped projecting section 19 to the inner side of the region where the external screw section 12 is provided, is formed in the tubular main body 11 in the axial direction thereof.

In the joint 10, numeral 25 denotes a fastening ring, which is formed in a cylindrical shape from a metal, such as brass, or the like, and comprises an external screw section 26, which can be screwed into the internal screw section 15 of the tubular main body 11, provided at one end thereof. The outer circumference of the other end of the fastening ring 25 is formed into an outer circumferential surface 27. This outer circumferential surface 27 is formed with a larger diameter than the external screw section 26, and consequently, an end face 28 is formed which confronts the end face 14 of the tubular main body 11. A ring-shaped packing 30 is provided in the base portion of the end face 28 of the fastening ring 25. The packing 30 is compressed between the fastening ring 25 and the tubular main body 11 when the fastening ring 25 is screwed into the tubular main body 11.

A hole 31 for passing the flexible tube 1 is formed along the length of the fastening ring 25. Inside this hole 31, a packing 32 is held in the inner circumference of the fastening ring 25 at the front end thereof, in other words, the end where the opening is provided. In the hole 31, a covering member receiving section 33 is formed in the fastening ring 25 towards the other end, in other words, the rear end thereof from the packing 32. An inner circumferential surface 34 is formed in the hole 31 in the region to the rear side of the covering member receiving section 33. This inner circumferential surface 34 is formed in the axial direction of the fastening ring 25, in such a manner that the length L thereof in the axial direction is equal to or longer than one pitch of the wave shape of the corrugated tube 2. The inner circumferential surface 34 is formed in such a manner that no significant interval is produced between the corrugated tube 2 and the circumferential surface 34 when the corrugated tube 2 is inserted into the fastening ring 25. The region of the boundary between the inner circumferential surface 34 and the covering member receiving section 33 is formed with a corrective tapered surface 35 in which the diameter gradually reduces from the covering member receiving section 33 towards the inner circumferential surface 34.

Inside the hole 31, a tapered surface 37, wherein the diameter expands towards the rear side of the fastening ring 25, is formed in the inner circumference of the rear end portion of the fastening ring 25, in a position to the rear of the inner circumferential surface 34. This tapered surface 37 is formed such that, at the rear end of the fastening ring 25, it has approximately the same diameter as the seal member receiving section 17 in the tubular main body 11, whilst on the side towards the open end of the fastening ring 25, it has the same diameter at the inner circumferential surface 34.

Figure 7:
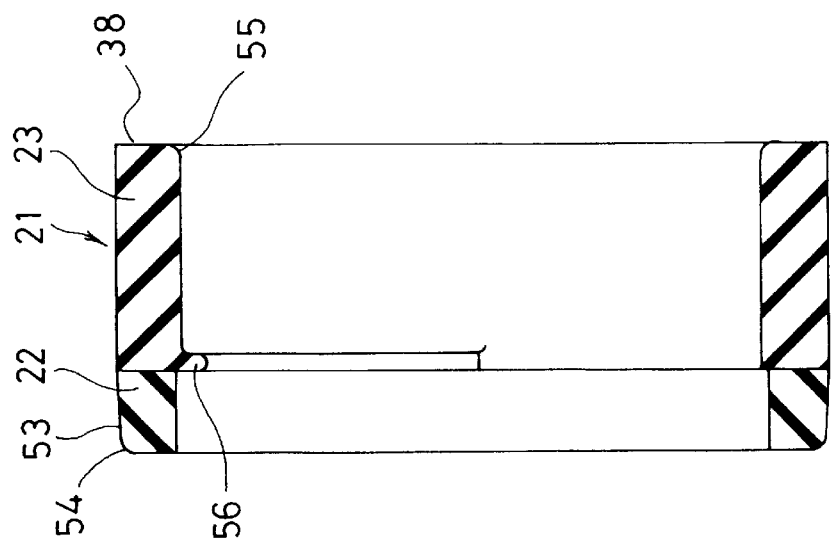
FIG. 7 is a sectional view of the seal member.

In a state where the fastening ring 25 is screwed fully into the tubular main body 11, as illustrated in the drawing, a space 39 is formed surrounded by the tapered surface 37 on the inside of the fastening ring 25, the inner circumferential surface 16 of the tubular main body 11, and the end face 38 of the seal member 21 (see FIG. 7). A ring-shaped retainer 40 is located in this space 39.

As shown in FIG. 1–FIG. 4, the retainer 40 is formed from a metal material, such as brass, or the like, and one end thereof is formed with an end face 41 in the radial direction of the retainer. A tapered face 42 which gradually reduces in diameter towards the one end of the retainer 40, in other words, towards the end face 41, is formed on the inner surface of the retainer 40. A projecting section 43 formed by the intersection of the tapered face 42 and the end face 41 and projecting obliquely inwards in the radial direction of the retainer is provided in a circumferential fashion. This projecting section 43 is formed in such a manner that the inner circumference thereof is of a dimension smaller than the outer diameter of the peak sections 4 of the corrugated tube 2 and equal to or greater than the outer diameter of the valley sections 5 of same, such that it can be inserted into the valley sections 5. An external circular tapered surface 44 inclined in the same direction as the tapered surface 37 of the fastening ring 25 is formed on the outer side of the retainer 40. The angles of the tapered surfaces 37, 44, may be the same, or they may differ by a certain amount.

Figure 5:
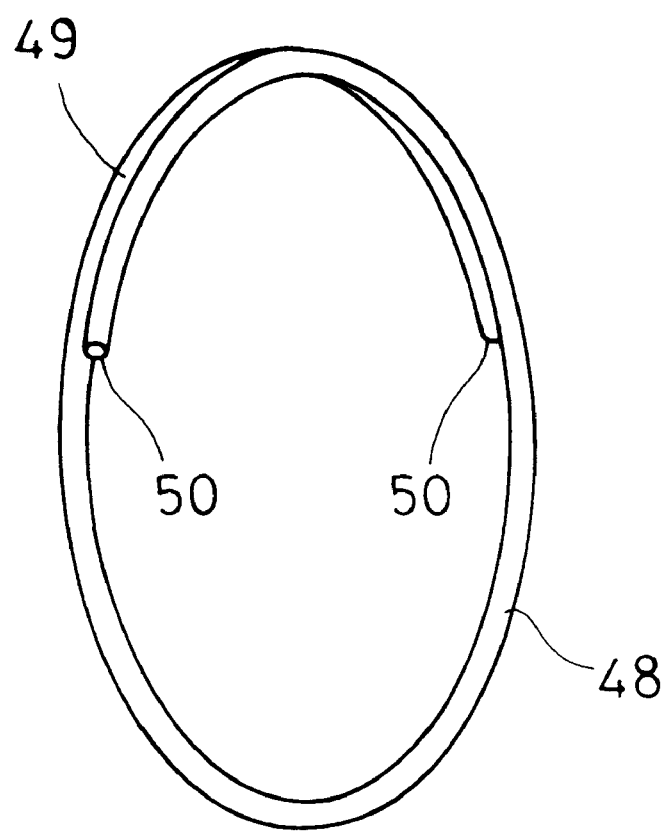
FIG. 5 is an oblique view of a ring spring in FIG. 1.

Incisions 45 running in the axial direction of the retainer 40 from one end thereof towards the other end are formed in a plurality of positions along the circumference of the retainer 40. These incisions 45 pass right through to the front of one end of the retainer 40, in such a manner that the retainer 40 only has a continuous circular form in the region of the other end thereof, where these incisions 45 are not formed. The connecting regions, located in the circumferential direction of the retainer 40, form a thin section 46 where the outer portion of the retainer 40 has been removed compared to the external circular tapered surface 44. A ring-shaped groove 47 having a rectangular cross-section is formed in the outer surface of the retainer 40 on the opposite side thereof to the thin sections 46 and external circular tapered surface 44. A ring spring 48 formed into a ring shape from a wire material and having a single split in the circumferential direction thereof is fitted into this ring-shaped groove 47, as illustrated in FIG. 1 and FIG. 5.

The ring spring 48 applies a compressive force to the projecting section 43 of the retainer 40, as illustrated in FIG. 1–FIG. 4, and it comprises an overlap section 49 in the circumferential direction thereof, such that it has a length equal to or greater than the circumference of the ring-shaped groove 47 in the retainer 40. Numerals 50 and 50 denote the ends of the wire material of the spring 48, in the circumferential direction thereof.

A washer 52 is provided inside the tubular main body 11 between the end face 41 of the retainer 40 and the end face 38 of the seal material 21, in such a manner that it covers the end face 38 of the seal material 21. This washer 52 is made from a resin material with good lubricating properties, or another type of material.

Figure 6:
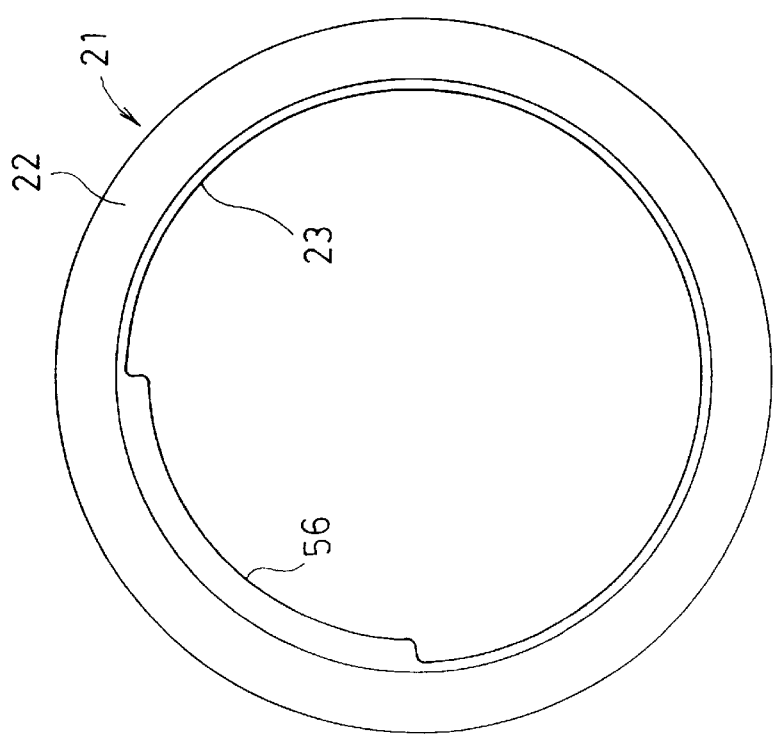
FIG. 6 is a side view of a seal member in FIG. 1.

FIG. 6 and FIG. 7 illustrate the detailed structure of the seal material 21. In this seal material 21, the fire-resistant section 22 is fabricated from a relatively hard material having fire-resistant properties, such as, for example, nitrile rubber or the like containing thermally expansive graphite. The normal rubber section 23 is made from a material which does not have fire-resistant properties, but is soft and has excellent sealing characteristics, such as nitrile rubber, or the like. As illustrated in FIG. 1, the end section of the corrugated tube 2 is inserted into this seal material 21 and as shown in FIG. 7, in a state prior to insertion of the corrugated tube 2, the fire-resistant section 22 is formed with a larger internal diameter than the normal rubber section 23. In other words, in order to display a sealing function, the fire-resistant section 22 and the normal rubber section 23 both have a compressive tendency in the radial direction in order that they are compressed by the receiving section 17 and the corrugated tube 2, the compressive tendency of the normal rubber section 23 being greater than that of the fire-resistant section 22.

In the sealing member 21, a tapered surface 53 whose diameter reduces towards the end of the sealing member 21 is formed on the outer circumference of the fire-resistant section 22. Round sections 54, 55 are formed respectively at the outer edge of the fire-resistant section 22 and the inner edge of the normal rubber section 23. These round sections 54, 55, and in particular, the round section 54 on the outer edge of the fire-resistant section 22, are formed with dimensions which allow them to be discerned readily by the naked eye. The outer edge of the normal rubber section 23 is formed in a square shape without a round section. Instead of the round sections 54, 55, it is also possible to form chamfers of a similar size.

In the rear portion of the normal rubber section 23 of the sealing member 21, more specifically, at the boundary between the fire-resistant section 22 and the normal rubber section 23, or in a portion of the normal rubber section 23 in the vicinity of this boundary, an inner projecting section 56 is formed as an integrated part of the normal rubber section 23. As illustrated in the drawings, this inner projecting section 56 is formed for prescribed distance along the inner circumference of the normal rubber section 23.

Figure 8:
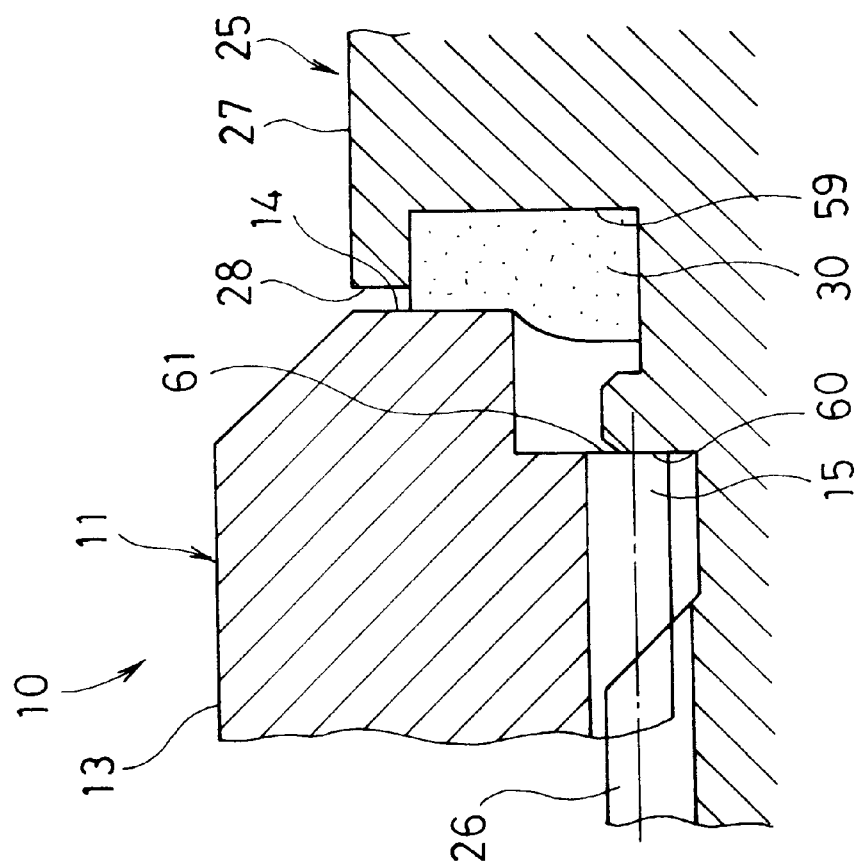
FIG. 8 is an expanded detailed view of the principal parts of FIG. 1.

FIG. 8 shows the detailed structure of the region for receiving the packing 30. A ring-shaped packing receiving groove 59 is formed in the base portion of the end face 28 of the fastening ring 25. The packing 30 is filled into this receiving groove 59. The packing 30 is made, for example, from non-woven fabric, porous resin, or the like, which has undergone dehydration processing. An end face 60 is formed in the radial direction of the fastening ring 25 in the region between the receiving groove 59 and the external screw section 26. This end face 60 is composed in such a manner that it contacts the end face 61 of the internal screw section 15 of the tubular main body 11, when the fastening ring 25 is screwed into the tubular main body 11, as illustrated in the diagram. When the end face 60 of the fastening ring 25 is in contact with the end face 61 of the internal screw section 15 in this way, the packing is compressed between the end face 14 of the tubular main body 11 and the receiving groove 59 in such a manner that it assumes 50–80% of its original thickness. By means of this compression, the packing 30 formed from the aforementioned materials assumes a state whereby water cannot pass therethrough, but gas can pass therethrough.

As shown in FIG. 1, an end section 62 of the hexagonal section 13 is formed in the region of the boundary between the hexagonal section 13 and the external screw section 12 of the tubular main body 11. This end section 62 is formed in such a manner that, when the fastening ring 25 is screwed into the tubular main body 11 to assume a prescribed state, in other words, when the end face 60 of the fastening ring 25 is in contact with the end face 61 of the internal screw section 15 of the tubular main body 11, then the end section 62 is located at a prescribed, distance 64 from the end face 63 of the opening in the fastening ring 25. More specifically, the end section 62 of the hexagonal section 13 is formed at a position whereby this distance 64 is equal to the length of the flexible tube 1 that is to be inserted into the joint 10. As shown in the diagram, the position of the end section 62 is closer to the fastening ring 25 than the position of the end of the external screw section 12 of the tubular main body 11 is. Therefore, in order to ensure the prescribed thickness of the tubular main body 11, a step section 65 is formed between the external screw section 12 and the end section 62 of the hexagonal section 13.

Figure 9:
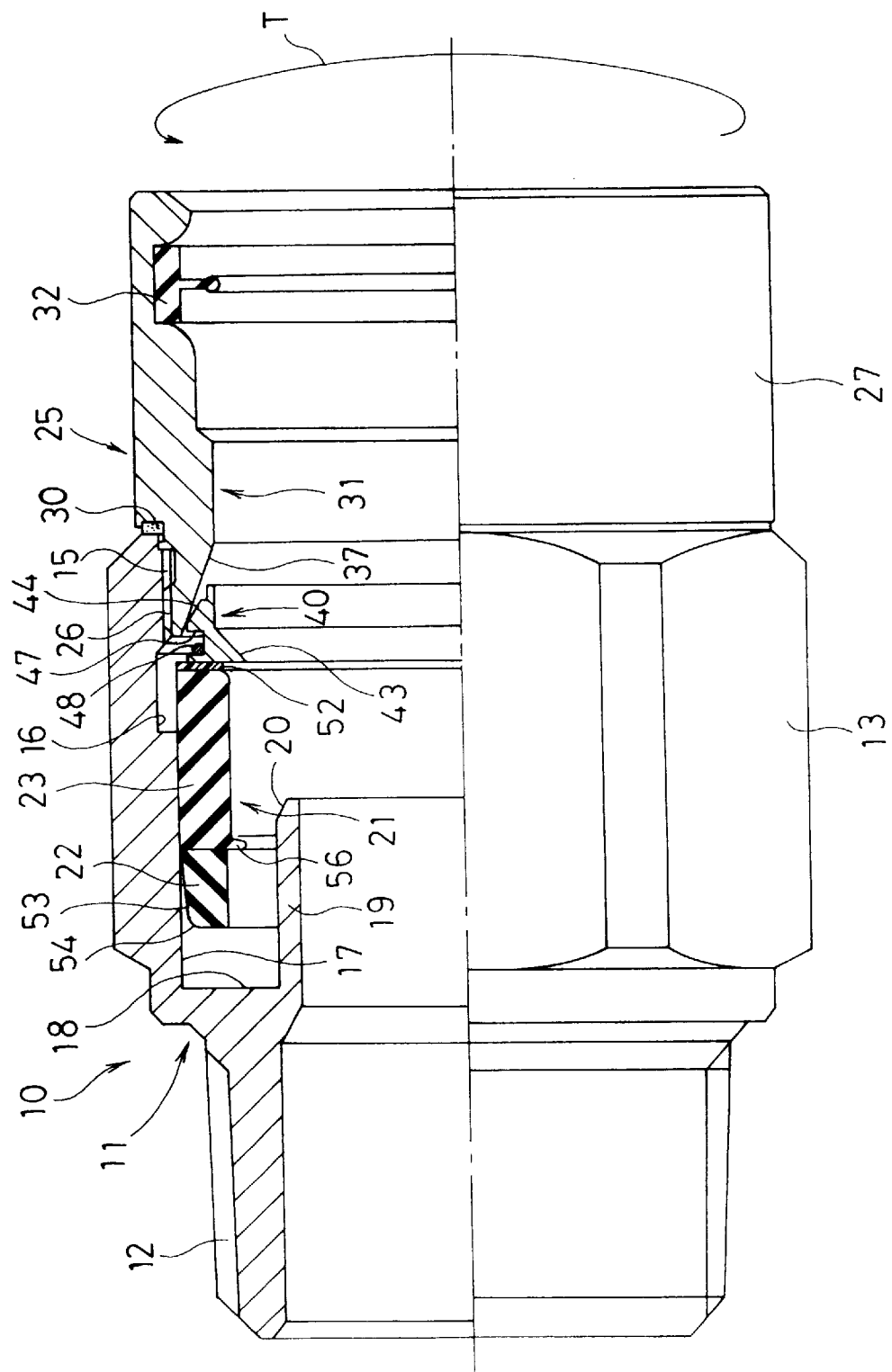
FIG. 9 is a diagram showing a state prior to insertion of the flexible tube into the joint in FIG. 1.

When constructing a one-touch joint 10 of this kind, firstly, as shown in FIG. 9, the seal member 21 is fitted into the receiving section 17 of the tubular main body 11, in a state where the fastening ring 25 has not been attached. A lubricant, such as silicon oil, or the like, is applied to the inner circumference of the seal member 21.

When this seal member 21 is fitted into the receiving section 17, as shown in the diagram, rather than the seal member 21 being pressed fully against the rear end face 18 of the receiving section 17, it is provisionally pressed lightly from its prescribed position towards the opening of the tubular main body 11, assuming a state where the end portion of the seal member 21 projects beyond the receiving section 17 in the axial direction. Since the round section 54 is formed on the outer edge of the fire-resistant section 22 of the seal member 21 and the tapered surface 53 is formed on the outer side of the fire-resistant section 22, this operation can be performed readily, despite the fact that the fire-resistant section 22 is relatively hard, even in cases where the open edge of the receiving section 17 is formed with a square shape. Even if the seal member 21 is orientated in the wrong direction and it is attempted to insert the seal member 21 whilst the normal rubber section 23 is positioned towards the rear side of the tubular main body 11, since the outer edges of the normal rubber section 22 are formed with a square shape rather than a round section, it is very difficult to insert the seal member 21 into the receiving section 17 and hence in this regard, it is possible to prevent incorrect orientation thereof.

The fastening ring 25 is screwed into the tubular main body 11 in a state where the seal member 21 has been inserted provisionally into the receiving section 17 and the retainer 40, wherein the ring spring 48 has been fitted into the ring-shaped groove 47, is accommodated on the inner side of the tapered surface 37 of the fastening ring 25. The packing 32 is fitted previously into the fastening ring 25, and the washer 52 is previously inserted between the retainer 40 and the seal member 21. By this means, as shown in FIG. 9, the retainer 40 is held between the projecting seal member 21 and the tapered surface 37 of the fastening ring 25, and is maintained in a centred state by the action of the tapered surface 37.

The steps up to this point are carried out at the manufacturing plant of the joint 10, and the joint is dispatched in the state illustrated in FIG. 9. In this manufacturing plant, when screwing the fastening ring 25 into the tubular main body 11, since the outer surface 27 of the fastening ring 25 has a circular shape, this outer surface 27 is held in a chuck, or the like, whilst the screwing in operation is performed and the fastening ring 25 is tightened to a prescribed torque T. In this tightened state, as shown in FIG. 8, the end face 60 of the fastening ring 25 confronts the end face 61 of the tubular main body 11. Since the tightening operation is carried out in the manufacturing plant, it can readily be controlled in such a manner that the tightening torque T has a prescribed uniform value.

In this way, the tightening torque T of the fastening ring 25 onto the tubular main body 11 is uniform, then the compression of the packing 30 by the end face 14 of the tubular main body 11 can be controlled readily to an appropriate value, such as 50–80% of its original thickness. Consequently, it is possible to prevent the packing 30 from being compressed further, and hence it is possible reliably to prevent the occurrence of problems relating to the desired sealing characteristics, and in particular, gas transmission characteristics.

When coupling the flexible tube 1 to the joint 10 in the state illustrated in FIG. 9, the flexible tube 1 is cut at a valley section of the corrugated tube 2, as shown in FIG. 1, and the covering member 3 is removed for a number of peak sections, for example, six peak sections, at the end of the corrugated tube 2, in which state the flexible tube 1 is inserted from the end portion of the fastening ring 25 into the hole section 31.

Figure 10:
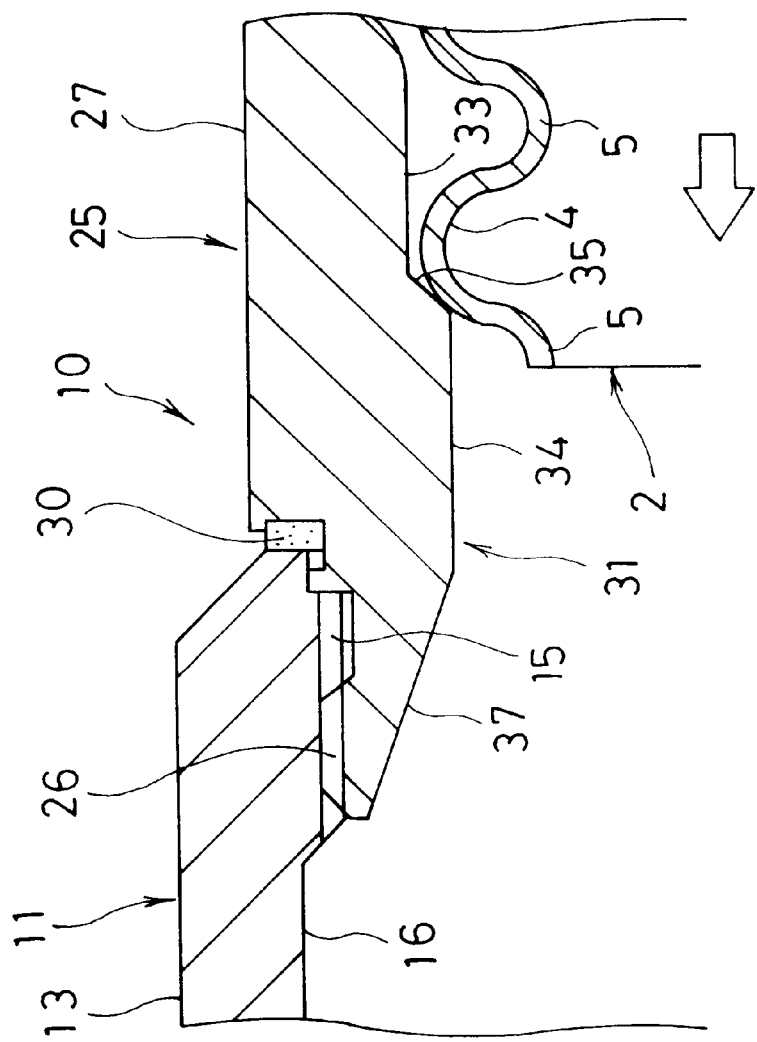
FIG. 10 is a diagram showing a state where a corrugated tube has been inserted into a fastening ring of the joint.

By so doing, the end portion of the corrugated tube 2 passes through the region of the inner circumferential surface 34. In this case, if the corrugated tube 2 has perfect circular shape, then it will pass by the tapered surface 35 and the inner circumferential surface 34 without any impediment. However, if the corrugated tube 2 has an elliptical shape, then when this corrugated tube 2 is inserted into the hole section 31 of the fastening ring 25, the peak sections 4 in the regions corresponding to the longer axis of the ellipse will contact the corrective tapered surface 35, as illustrated in FIG. 10. In this case, if force is applied and the corrugated tube 2 is pushed to the rear side of the fastening ring 25, then due to the reactive force from the tapered surface 35 created by this force, a compressive force will be applied to the peak sections 4 in the regions corresponding to the longer axis of the ellipse in the thin corrugated tube 2. Thereby, the elliptical corrugated tube 2 is corrected to a perfect circular shape which can be passed inside the inner circumferential surface 34, and hence it can be pushed fully to the rear side of the fastening ring 25. Incidentally, since only the portions of the corrugated tube 2 corresponding to the longer axis of the ellipse, in other words, only portions of the corrugated tube 2 running in the circumferential direction of the corrugated tube 2 come into contact with the tapered surface 35, it only requires a small amount of force to compress this section and correct the tube 2 to a perfect circular shape.

The more acute the angle of the tapered surface 35 with respect to the centre of axis, the smaller the force required to correct the elliptical shape. However, if this angle is made too acute, the fastening ring 25 will become longer and the joint will become large in size, and hence it is desirable to set an angle of the order of 45°. Moreover, in some cases, rather than providing the tapered surface 35 over a wide range running from the covering member receiving section 33 to the inner circumferential surface 34, it may also be sufficient to provide, for example, a simple chamfer at the end of the inner circumferential surface 34 towards the open side of the fastening ring 25. This is because the corrugated tube 2 itself has a curved structure, and therefore it can be guided readily inside the inner circumferential surface 34.

The corrugated tube 2 passes the position of the inner circumferential surface 34 and since the inner circumferential surface 34 is formed in such a manner that the length L thereof is at least one pitch of the waveform of the corrugated tube 2, the corrugated tube 2 remains in line with the axial direction of the fastening ring 25, without there being any risk of the corrugated tube 2 falling with respect to the axial direction of the fastening ring 25, and hence the ellipse can be corrected reliably to a perfect circular shape.

If the length L of the inner circumferential surface 34 is conversely shorter than one pitch of the waveform of the corrugated tube 2, then this corrugated tube 2 may fall when it passes through the position of the inner circumferential surface 34, and in this case, if the corrugated tube 2 has an elliptical shape, it may pass by the position of the tapered surface 35 and the inner circumferential surface 34 without being corrected to a circular shape.

Figure 11:
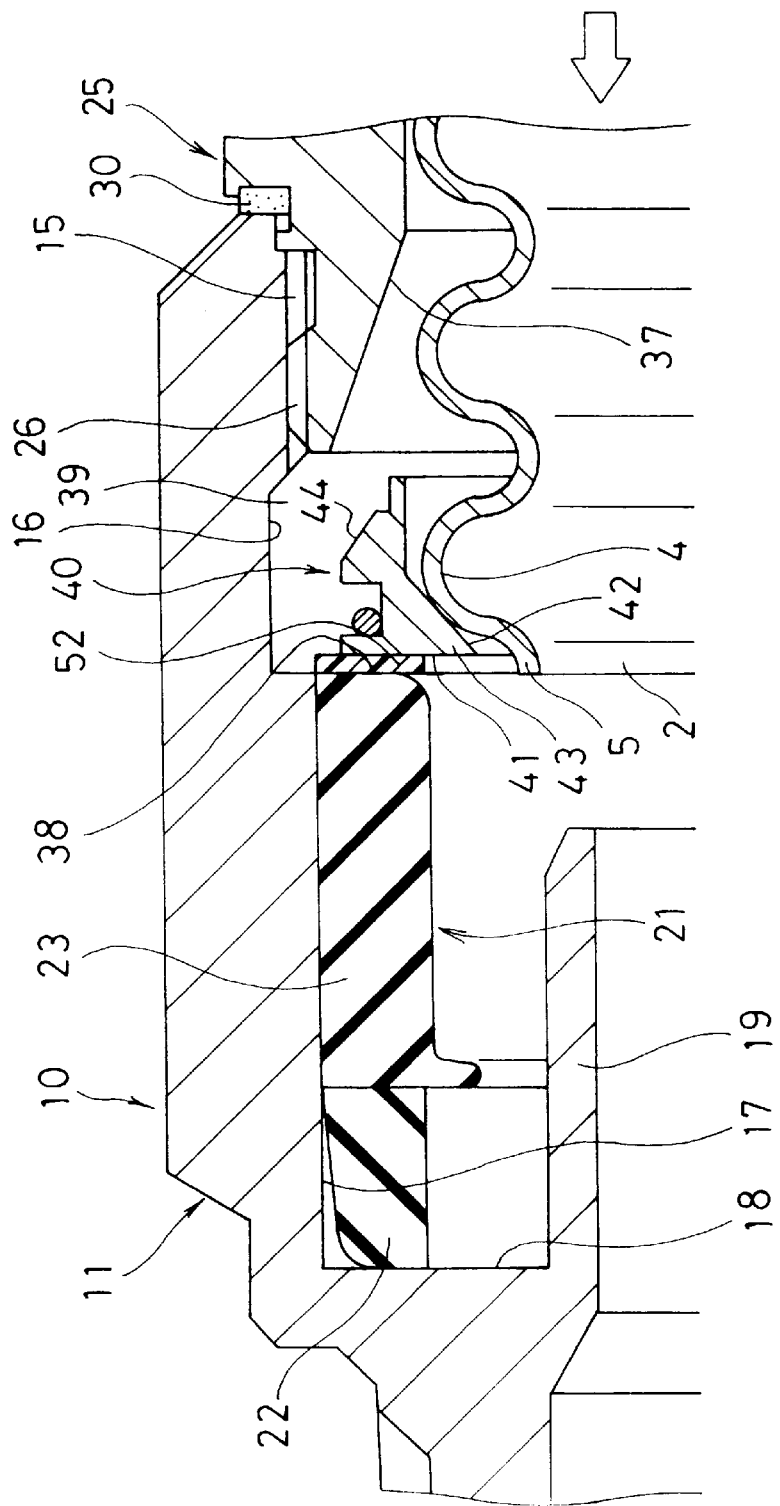
FIG. 11 is a diagram showing a state where a corrugated tube is in contact with the retainer of the joint.
Figure 12:
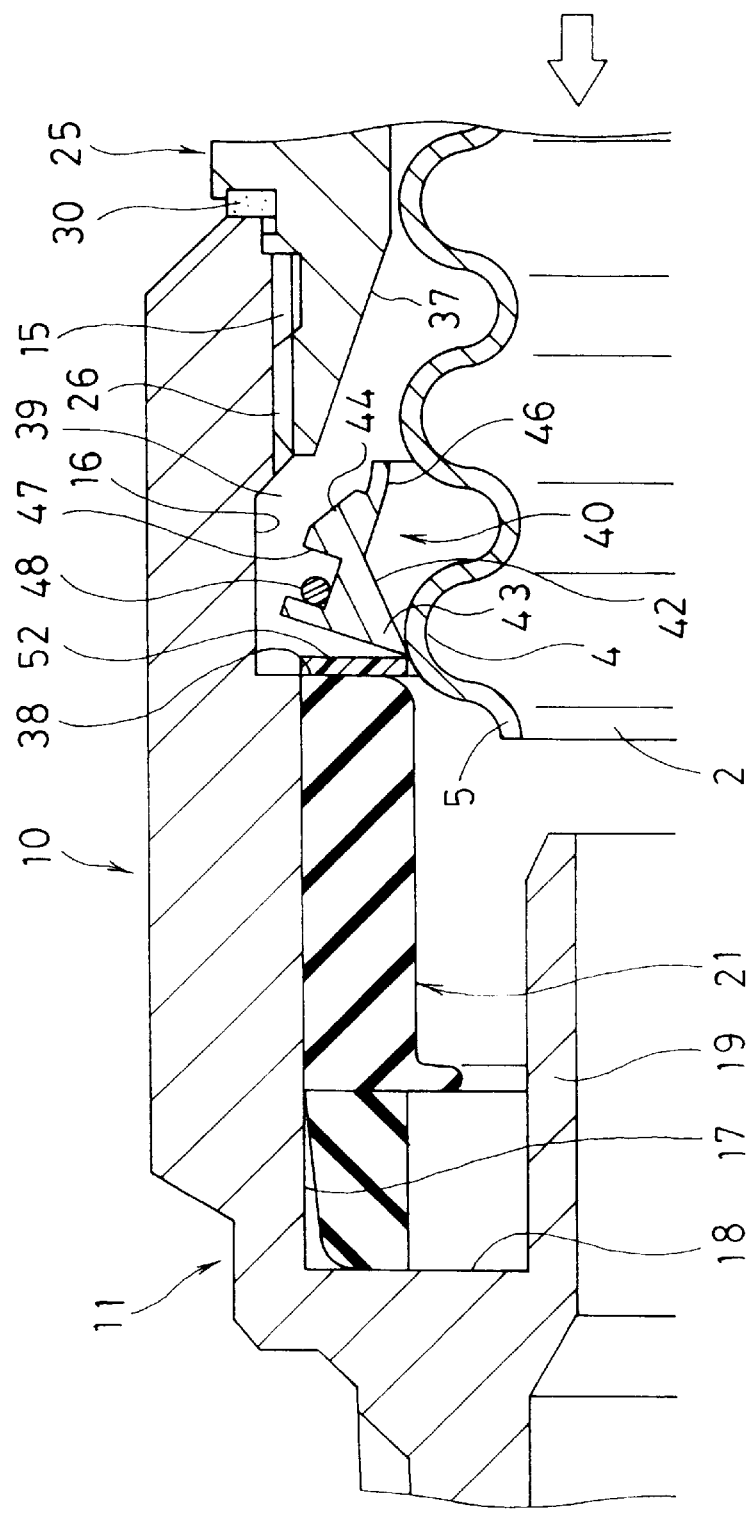
FIG. 12 is a diagram showing a state where the corrugated tube has caused the retainer to expand in diameter.

When the flexible tube 1 is inserted further, the peak section at the end of the corrugated tube 2 meets the tapered surface 42 of the retainer 40, which is in a centered state as illustrated in FIG. 9, and pushes the seal member 21 via the retainer 40 and the washer 52 until the seal member 21 meets the rear end face 18 of the receiving section 17. FIG. 11 illustrates this state. Thereby, the external circular tapered surface 44 of the retainer 40 separates from the tapered surface 37 of the fastening ring 25. In this state, as shown in FIG. 12, the peak section 4 of the corrugated tube 2 acts strongly against the tapered surface 42 of the retainer 40, and it pushes the retainer 40 open and passes inside the projecting sections 43 thereof. In this case, since a plurality of incisions 45 are formed along the circumference of the retainer 40 and since the retainer 40 also comprises the thin section 46, it can be caused to expand relatively simply. Moreover, this pushing open operation is performed against the elasticity of the ring spring 48 fitted into the ring-shaped groove 47 of the retainer 40.

When the retainer 40 is pushed open in this way, since it is only in contact with the washer 52 and is not pressed against the end face 38 of the rubber seal member 21, it does not receive pressure from the seal member 21 and become difficult to expand during the aforementioned expansion operation. Therefore, it is possible to cause the retainer 40 to expand readily by means of the force used to insert the corrugated tube 2 inside the joint 10, and hence the corrugated tube 2 can be inserted into the joint 10 without requiring a large force.

When the retainer 40, in other words, the projecting sections 43 thereof, are caused to expand, the spring 48 also expands accordingly. The spring 48 comprises the overlap section 49 as shown in FIG. 5, and the overlap section 49 is composed such that it has a length whereby, even if the spring 48 does expand in this way, the ends 50, 50 of the wire material in the circumferential direction of the spring 48 will not open up beyond a circumferential distance equal to a single projecting section 43 formed by any pair of adjacent incisions 45, 45 in the retainer 40. Therefore, it is possible reliably to prevent the occurrence of incidents where one of the projecting sections 43 becomes caught between the circumferential ends 50, 50 of the spring 48, when the projecting section 43 is caused to expand in a case where the overlap section 49 does not have such a length.

If one of the projecting sections 43 does become caught between the circumferential ends 50, 50 of the spring 48, then after the peak section 4 of the corrugated tube 2 has passed through the projecting sections 43, the spring 48 will not be able to contract, and therefore the projecting section 43 in question will not be made to contract either. However, by setting the length of the wire material in the spring 48 in such a manner that the circumferential ends 50, 50 of the wire material will not open up beyond a circumferential distance corresponding to one projecting section 43 formed by any pair of adjacent incisions 45, 45, it is possible to prevent the occurrence of situations where one of the projecting sections 43 is unable to contract, due to its becoming caught as described above. Therefore, it is possible to cause each of the projecting sections 43 to contract reliably, by means of the spring 48, and engage with one of the valley sections 5 on the outer circumference of the corrugated tube 2.

When several peak sections of the end of the corrugated tube 2 have passed the projecting sections 43 of the retainer 40 in this way, these several peak sections at the end of the corrugated tube 2 are accommodated inside the seal member 21, as illustrated in FIG. 1. In this case, the retainer 40 returns to its original contracted state due to the elasticity of the thin section 46 and, in particular, the elasticity of the ring spring 48, and the projecting sections 43 fit into and engage with one peak section 5 of the corrugated tube 2.

If the retainer 40 is able to return to its original contracted state under the effect of its own elasticity, then a composition omitting the ring spring 48 can be adopted. Moreover, in this case, a composition omitting the ring-shaped groove 47 can also be adopted.

Since the round section 55 is formed on the inner circumference of the normal rubber section 23 in the seal member 21, the corrugated tube 2 is inserted readily inside the seal member 21 by means of the peak sections 4 thereof being guided by the round section 55. Moreover, the lubricant is coated onto the inner surface of the seal member 21, as described above, then the peak sections 4 can be inserted smoothly using light force. The lubricant may also be coated onto the outer circumference of the end portion of the corrugated tube 2, or it may be coated onto both the seal member 21 and the corrugated tube 2.

Figure 13:
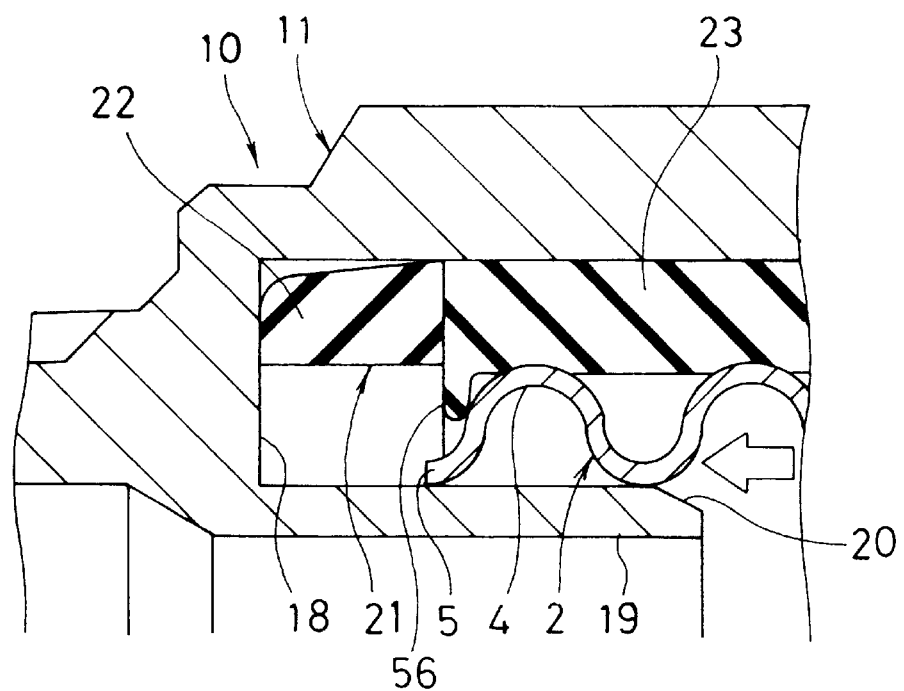
FIG. 13 is a diagram showing a state where the corrugated tube is in contact with an inner projecting section of the seal member in the joint.
Figure 14:
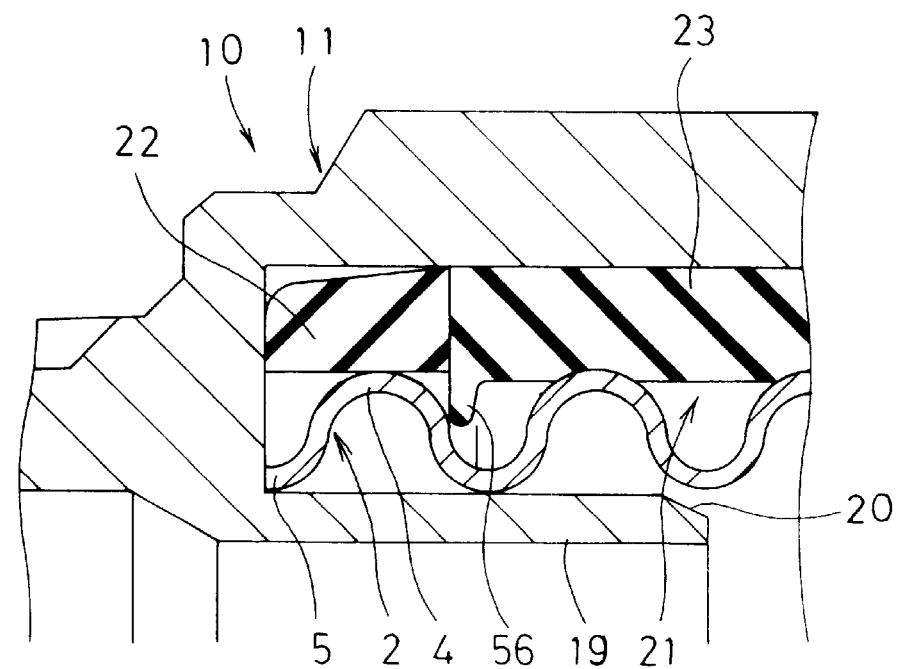
FIG. 14 is a diagram showing a state where the corrugated tube has passed by the inner projecting section and has arrived at an inner surface of a fire-resistant section of the seal member.

When the corrugated tube 2 is inserted inside the seal member 21 and the peak section 4 at the end of the tube 2 eventually meets the inner projecting section 56 of the seal member 21, as illustrated in FIG. 13, the operator feels the resistance thereof. If further inserting force is applied subsequently, then the peak section 4 of the corrugated tube 2 pushes the inner projecting section 56 aside elastically, passes same, and enters inside the fire-resistant section 22. When the peak section 4 has passed the inner projecting section 56 and entered inside the fire-resistant section 22, the resistance caused by confrontation with the inner projecting section 56 is released, and hence the operator can perceive that the corrugated tube 2 has been inserted to a prescribed position.

The region where the inner projecting section 56 of the normal rubber section 23 is formed can be set as appropriate. In other words, the distance over which the inner projecting section 56 is formed in the circumferential direction can be set appropriately according to the hardness of the normal rubber section 23, the height of the inner projecting section 56, and the like, in such a manner that the resistance felt by the operator when the peak section 4 of the corrugated tube 2 meets the inner projecting section 56, and the resistance when the peak section 4 pushes past the inner projecting section 56 and passes by same, are of desirable magnitude. Specifically, forming the inner projecting section 56 over a range of approximately 90°, as illustrated in FIG. 6 and FIG. 7, is desirable from the viewpoint of performance and manufacturability of the seal member 21. However, it is also possible to make the inner projecting section 56 smaller or larger than this, or to make it extend for the entire circumference of the seal member 21, or alternatively, projecting sections of uniform size can be formed respectively at a plurality of positions along the circumference.

By inserting the corrugated tube 2 inside the seal member 21, and in particular, by causing the inner surface of the normal rubber section 23 to press tightly against the peak section 4 of the corrugated tube 2, a desired sealing function is achieved.

When the end portion of the corrugated tube 2 is fitted inside the seal member 21 in this way, the valley sections 5 in the end portion are simultaneously guided by the tapered surface 20 of the ring-shaped projecting section 19 in such a manner that they fit outside this ring-shaped projecting section 19. Consequently, even if the elasticity of the seal member 21 declines, due to the occurrence of a fire, or the like, it is possible reliably to prevent shifting in the end portion of the corrugated tube 2 and consequent deterioration of sealing characteristics.

In this case, since the ring-shaped projecting section 19 is located to the inner side of the seal member 21, the seal member 21 and ring-shaped projecting section 19 are formed in similar positions running in the axial direction of the joint 10, and hence it is not necessary to provide a space running in the axial direction for the ring-shaped projecting section 19 that is separate from space for the seal member 21. Therefore, the tubular main body 11 can be shortened in length accordingly, and hence the size of the overall joint 10 can be reduced.

Furthermore, since shifting of the end portion of the corrugated tube 2 is prevented by means of the ring-shaped projecting section 19, and moreover, shifting of the corrugated tube 2 in the region of the inner circumferential surface 34 of the fastening ring 25 is prevented by means of the inner circumferential surface 34, the corrugated tube 2 does not bend with respect to the joint 10, and therefore the flexible tube 1 can be coupled to the joint 10 in a state whereby no decline occurs in the sealing function provided by the seal member 21.

The fire-resistant section 22 of the seal member 21 is hard compared to the normal rubber section 23, but since the internal diameter thereof is larger than that of the normal rubber section 23, the compressive tendency created by the peak sections 4 of the corrugated tube 2 is less than in the normal rubber section 23, and hence the corrugated tube 2 can be inserted readily inside the fire-resistant section 22 in the same manner as the normal rubber section 23.

Under normal temperature conditions, it is possible to achieve the desired sealing properties principally by means of the normal rubber section 23, and therefore no problems arise due to the fact that the internal diameter of the fire-resistant section 22 is greater and the compressive force acting thereon is smaller. Moreover, since the fire-resistant section 22 has a composition containing thermally expansive graphite mixed into nitrile rubber, for example, then even if the internal diameter is somewhat large, in the event of abnormally high temperatures, due to a fire, or the like, it will swell and tightly seal the external circumference of the corrugated tube 2. Therefore, even if the non-fire-resistant normal rubber section 23 is burnt away, the desired sealing characteristics can be achieved reliably.

FIG. 1 shows a state where the operation of coupling a corrugated tube 2 in a flexible tube 1 to a joint 10 has been completed. Here, the covering member 3 is inserted into the receiving section 33 and brought towards the corrective tapered surface 35. In this state, the packing 32 in the fastening ring 25 seals the outer circumference of the covering member 3 of the flexible tube 1. The packing 32 and 30 is used principally to prevent infiltration of water, or the like, into the interior of the joint 10.

The packing 30 also has the following functions. When constructing a room provided with gas piping, nailing tasks are often performed after laying the flexible tube 1. In this case, if the end of a nail accidentally comes against the flexible tube 1, the nail will pierce the corrugated tube 2 and a gas leak will occur in that region. However, since the covering member 3 made from resin forms a tight seal about the nail, there will be no external leakage of gas from this region. Consequently, the gas leaking out from the corrugated tube 2 passes along the gap between the corrugated tube 2 and the covering member 3 and flows inside the joint, where it passes through other gaps until it reaches the packing 30.

In this case, since the packing 30 transmits gas, as described above, an external gas leak from this packing 30 occurs, and consequently, it is possible to discover that a gas leak due to nailing has occurred immediately following the nailing operation. Therefore, the occurrence of a gas leak can be discovered swiftly and dealt with in an appropriate manner, during construction of a room, in other words, at a stage of the construction where the room is not yet completed.

Figure 15:
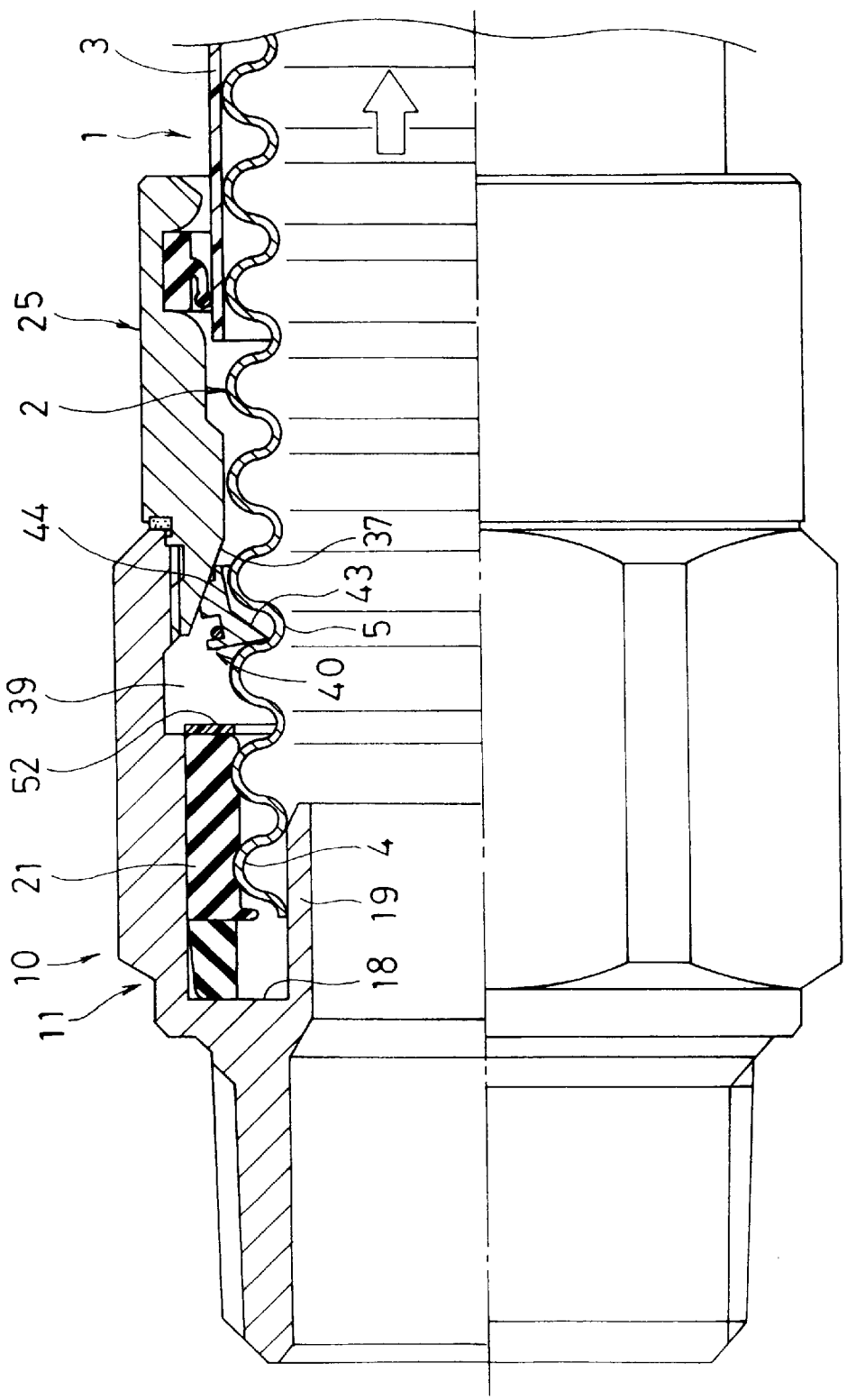
FIG. 15 is a diagram showing a state where there is a force acting to detach the flexible tube from the joint.

If a force acting to detach the flexible tube 1 is applied thereto whilst it is connected to the joint 10, then as shown in FIG. 15, the external circular tapered surface 44 of the retainer 40, the projecting sections 43 of which are engaged with one valley section 5 of the corrugated pipe 2, confronts the tapered surface 37 of the fastening ring 25, and the retainer 40 receives a reaction from the fastening ring 25 in an inward radial direction. Therefore, the projecting sections 43 of the retainer 40 press against the one valley section 5 of the corrugated tube 2, about the whole outer circumference thereof, thereby forming a secure coupling between the retainer 40 and the corrugated tube 2, and hence reliably preventing detachment of the flexible tube 1 from the joint 10.

There follows a description of a method for connecting a joint 10, coupled to a flexible tube 1 as described above, with a body to be connected, such as a gas pipe, gas meter, or the like.

Figure 16:
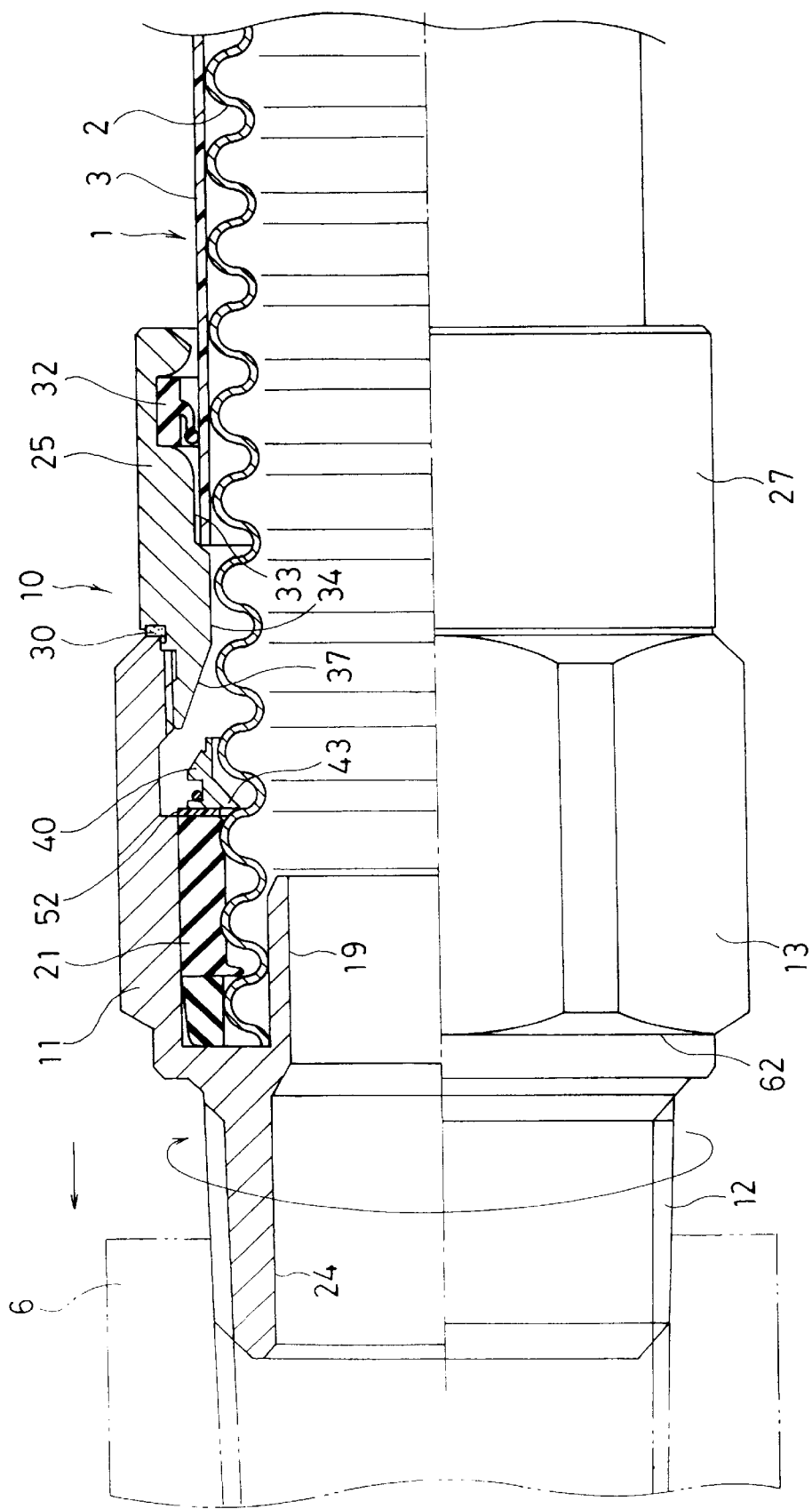
FIG. 16 is a diagram showing a state where the joint coupled to the flexible tube is connected to a body that is to be connected.

When it has been coupled completely to the joint 10, the corrugated tube 2, in other words, the flexible tube 1, is only in contact with the seal member 21 and retainer 40, etc., and it is not restricted by the joint 10 in the rotational direction, but is capable of rotating freely with respect to the joint 10. Therefore, as illustrated in FIG. 16, after coupling the flexible tube 1 to the joint 10, the joint 10, in other words, the tubular main body 11 can be connected to the body to be connected 6 by attaching a tool, such as a spanner, or the like, to the hexagonal section 13, and screwing the joint 10.

Therefore, the operation of inserting the flexible tube 1 into the joint 10 can be carried out in a free state when the joint 10 is not connected to the body to be connected 6, thereby making the operation versatile and easy to perform. In this case, since the joint 10 and flexible tube 1 are both capable of rotating freely relative to each other, a merit is obtained in that when the joint 10 is screwed into and fixed to the body to be connected 6, there is no secondary rotation of the flexible tube 1.

Moreover, it is normal for a standard tool, such as a spanner, or the like, to be used for carrying out fastening work at the site where piping is being laid, and since the hexagonal section 13 for coupling with this tool is formed only on the outer circumference of the tubular main body 11, and not on the outer circumference of the fastening ring 25, the operator will always engage the tool with the hexagonal section 13 on the tubular main body 11, and will not mistakenly apply the tool to the fastening ring 25. Therefore, it is possible to screw the tubular main body 11 of the one-touch joint 10 into the body to be connected 6, without any damaging of the screw thread section between the internal screw section 15 and the external screw section 26, which forms the coupling region between the tubular main body 11 and the fastening ring 25, and without any further compression of the packing 30 which has previously been compressed to a suitable ratio of 50–80% of its original thickness, as described above.

Moreover, since the fastening ring 25 is formed only with an outer circumferential surface 27 and without a hexagonal section for coupling with a tool, a merit is obtained in that there is no occurrence of accidents whereby, during the operation of screwing the joint 10 to the body to be connected 6, or another operation, a tool is mistakenly coupled to the fastening ring 25, causing disassembly of the tubular main body 11, fastening ring 25 and retainer 40, or the like.

Figure 17:
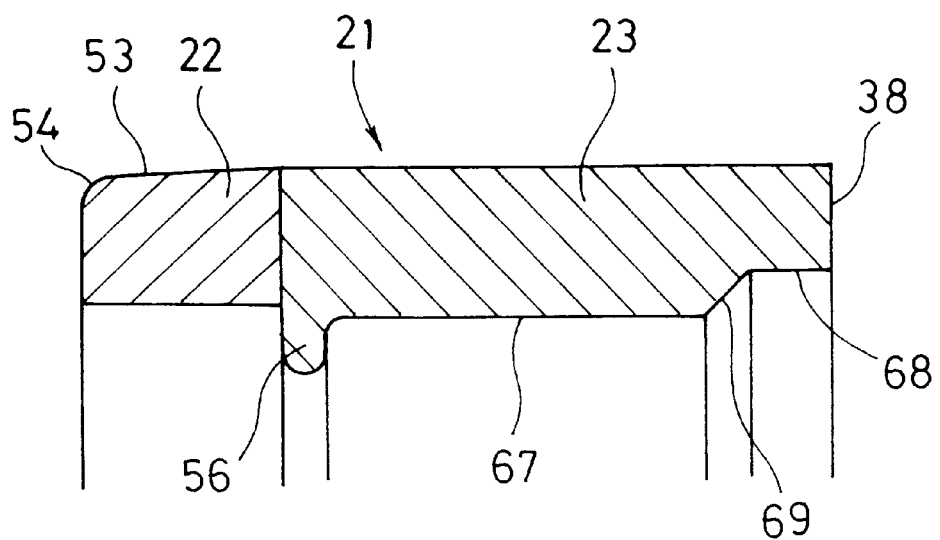
FIG. 17 is a sectional view showing a variation of the seal member.

FIG. 17 shows a variation of the seal member 21. The seal member 21 has a large diameter section 68 formed along the internal circumference of the opening portion of the normal rubber section 23, which large diameter section is larger than that of the predetermined internal circumferential section of the rubber section 23. The inner diameter of the large diameter section 68 is slightly larger than the outer diameter of the peak section of the corrugated tube, such that the outer circumference of the corrugated tube is not sealed at the large diameter section 68. The internal circumferential section 67 and the large diameter section 68 are connected to each other by a tapered section 69. This tapered section 69 corresponds to the round section 55.

With this construction, if the insertion resistance is large to some extent when the corrugated tube of the flexible tube is inserted, the corrugated tube is suitably sealed by the seal member 21 at the time only the first one peak section exceeds the retainer and enters the normal rubber section 23 of the seal member 21, which may possibly lead an operator to mistake that the inserting operation has been completed. In such a case, however, if the flexible tube receives a force to slip out of a joint, slipping out is caused to be performed until the retainer reaches the tapered face of a stop ring, so that the sealing effect between the seal member 21 and the corrugated tube is lowered, threatening gas leakage to occur.

By adopting the shown configuration in which a large diameter section 68 is formed for a predetermined range in the axial direction, unless the corrugated tube exceeds over a certain length or a certain number of peak sections so as to enter into the interior of the seal member 21, the corrugated tube will not reach the internal circumferential section 67 and the sealing between the corrugated tube and the seal member 21 will not be effected. As a result, it is secured that the corrugated tube enters inside the seal member 21 for a certain length or more, and the above mentioned gas leakage can be prevented from occurring.

Likewise, even if a large tapered portion is formed only with a taper face, without forming a large diameter section 68, it is possible to form an internal circumferential section 67 in the inner deep portion of the seal member 21. However, this presents a disadvantageous and impractical case where the area of the end face 38 of the seal member 21 becomes excessively small and the backup force to spread open the retainer by inserting the corrugated tube becomes insufficient.

There follows a description of a method for inserting the flexible tube 1 onto the tubular main body 11 to a prescribed length, by using the end section 62 of the hexagonal section 13 of the tubular main body 11 as an indicator. As described above and as illustrated in FIG. 1, the end section 62 of the hexagonal section 13 is formed in a position such that the distance 64 thereof from the end face 63 of the fastening ring 25 is equal to the length of the front portion of the flexible tube 1 that is to be inserted into the joint 10.

Figure 18:
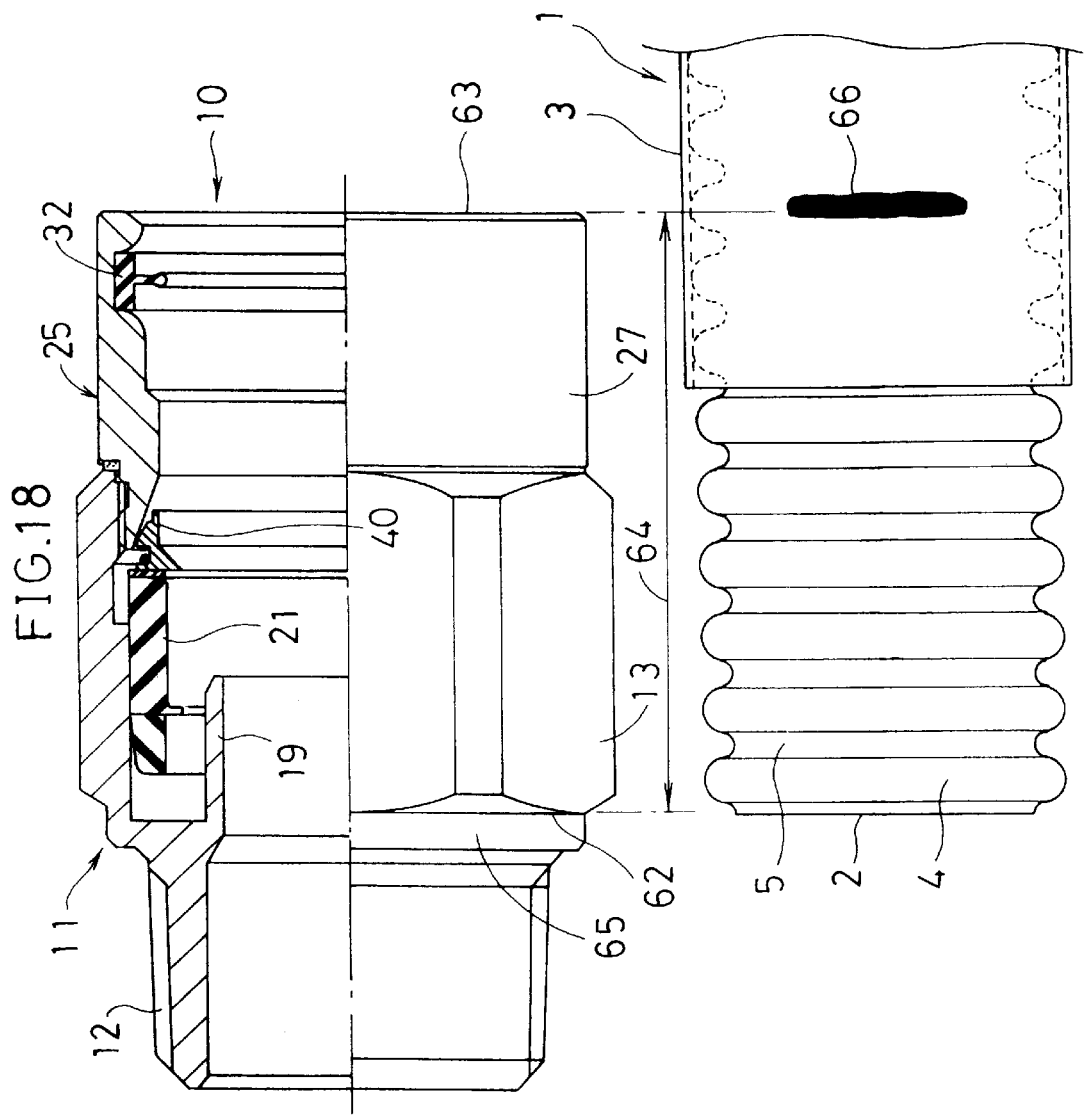
FIG. 18 is a diagram illustrating the provision of a mark on a flexible tube in order that the flexible tube can be inserted into a tubular main body up to an appropriate length.

As shown in FIG. 18, at the site where piping is being installed, the flexible tube 1 is placed alongside the joint 10 in such a manner that the front end of the corrugated tube 2 in the flexible tube 1, from which the covering member 3 has been removed for a length corresponding to several peak sections, is aligned with the position of the end section 62 of the hexagonal section 13 of the tubular main body 11, and a marking 66 is made on the outer surface of the covering member 3 of the flexible tube 1 at a position corresponding to the end face 63 of the fastening ring 25. In this way, the distance from the front end of the corrugated tube 2 to this marking 66 forms the prescribed length of the flexible tube 1 that is to be inserted into the joint 10.

In a similar manner, it is also possible, conversely, to align the front end of the corrugated tube 2 with the position of the end face 63 of the fastening ring 25, and make a marking on the outer surface of the corrugated tube 1 at a position corresponding to the end section 62 of the hexagonal section 13.

In the foregoing, the end face 63 of the fastening ring 25 is taken as a reference point and the end section 62 of the hexagonal section 13 is formed in a position at a prescribed distance 64 from same, in other words, a composition is adopted wherein the position of the end section 62 of the hexagonal section 13 is changed according to the size of the distance 64, but conversely, it is also possible to take the end section 62 of the hexagonal section 13 as a reference point and form the end face 63 of the fastening ring 25 in a position at a prescribed distance 64 from same. Namely, a composition may be adopted wherein the length of the fastening ring 25 is changed according to the distance 64. In this case, the base end of the external screw section 12 can be formed directly as the end section of the hexagonal section 13, without providing a step section 65 in the tubular main body 11.

Figure 19:
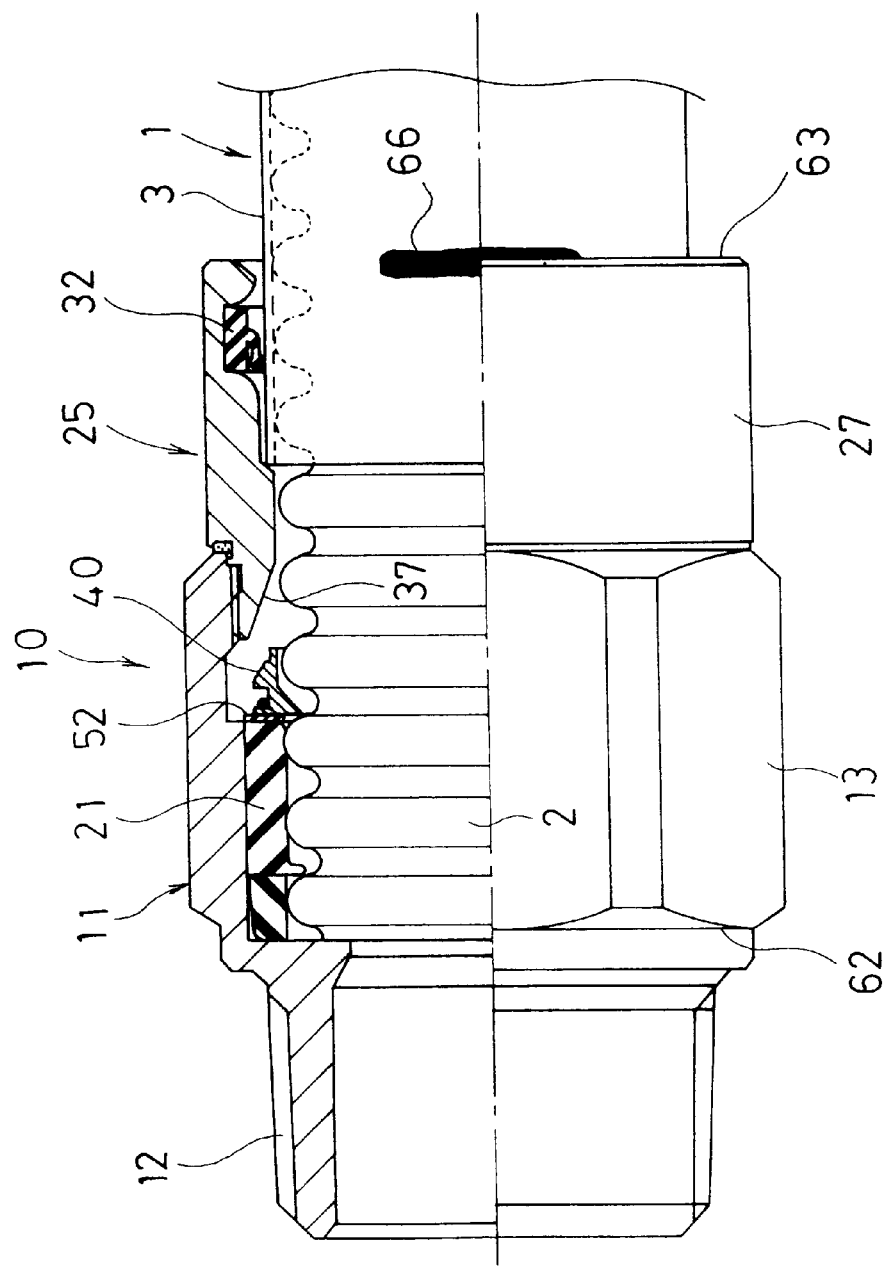
FIG. 19 is a diagram showing a state where the flexible tube provided with the mark has been inserted into the tubular main body up to a prescribed length.

In this way, the flexible tube 1 provided with the marking 66 is inserted into the joint 10, and as illustrated in FIG. 19, by inserting the flexible tube 1 up to a point where the position of the marking 66 corresponds to the end face 63 of the fastening ring 25, the flexible tube 1 is inserted up to a prescribed position inside the joint 10.

The end section 62 of the hexagonal section 13 in the cylindrical main section 11 and the end face 63 of the fastening ring 25 are used as indicators for making the marking 66 on the flexible tube 1, but it is also possible to form a marking by using features other than the end section and end face, such as notches, projections, of the like.

What is claimed is:

1. A joint for a flexible tube composed of a corrugated tube, comprising:

a tubular main body; a fastening ring, the front end portion of which screws inside said tubular main body, a tapered surface expanding in diameter towards the front end thereof being formed on the inner circumference of the fastening ring; a ring-shaped seal member provided inside said tubular main body; and a ring-shaped retainer located inside said tubular main body, between the tapered surface of the fastening ring and the seal member;

wherein the corrugated tube comprises a plurality of peak sections and valley sections and can be inserted from the end portion of the fastening ring to the inside of the fastening ring and the inside of the retainer and seal member provided in said tubular main body; and said retainer comprising projections which project in inward radial directions, and an outer circumferential surface capable of contacting the tapered surface on the inner side of said fastening ring; said retainer being formed in such manner that the retainer can be pushed open elastically by the peak section of the corrugated tube when the corrugated tube is inserted into the retainer and can be deformed to engage the projections with the valley section of the corrugated tube when the peak section has passed; and said tubular main body comprises a ring-shaped projecting section formed in the tubular main body to the inner side of the seal member, in such a manner that it extends from the front end opening of the corrugated tube inserted inside the seal member into the end portion of the corrugated tube.

2. A joint according to claim 1, comprising a spring formed from ring-shaped wire material, which is coupled to the outer circumference of the retainer and exerts a force acting to return the projections of the retainer to their original state when the projections of the retainer are pushed open elastically by the peak sections of the corrugated tube.

3. A joint according to claim 2, wherein the wire material of the spring has one end section and a further end section in the circumferential direction thereof, said spring being formed to a length whereby the two end sections of the wire material in the circumferential direction thereof do not open up beyond the circumferential width of one of the projections formed in the retainer by a pair of adjacent incisions, when the projections in the retainer are pushed open by the peak sections of the corrugated tube during insertion of the corrugated tube.

4. A joint according to claim 1, wherein at least a portion of the seal member is formed from a material having fire-resistant properties.

5. A joint according to claim 4, wherein the material having fire-resistant properties in a fire-resistant rubber containing thermally expansive graphite.

6. A joint according to claim 4, wherein the seal member comprises a section formed from the material having fire-resistant properties and a section formed from a material not having fire-resistant properties, said sections being formed into an integrated body.

7. A joint according to claim 6, wherein the seal member is formed such that the internal diameter of the section having fire-resistant properties is larger than the internal diameter of the section not having fire-resistant properties, at the stage prior to insertion of the corrugated tube.

8. A joint according to claim 6, wherein the outer circumference of the section having fire-resistant properties in the seal member is formed with a tapered surface which reduces in diameter towards the front end thereof.

9. A joint according to claim 1, wherein the tubular main body comprises a seal member receiving section which is open to the open side of the tubular main body, in such a manner that the seal member can be installed via the open side of the tubular main body;

the seal member comprises a section having fire-resistant properties located to the rear side of the tubular main body in the receiving section, and a section not having fire-resistant properties located to the open side of the tubular main body in the receiving section, said sections of the seal member being formed into an integrated body; and the seal member comprises, as an indicator for distinguishing the portion thereof to be located towards the rear side of the tubular main body in the receiving section and the portion thereof to be located towards the open side of the tubular main body in the receiving section, at least one of either a first round section or chamfered section formed on the outer circumferential edge of the section having fire-resistant properties, and/or a second round section or chamfered section formed on the inner circumferential edge of the section not having fire-resistant properties.

10. A joint according to claim 1, wherein the seal member comprises a section having fire-resistant properties located to the rear side of the tubular main body, and a section not having fire-resistant properties located to the open side of the tubular main body, said sections of the seal member being formed into an integrated body; and an inward-orientated projection being formed in the section of said seal member not having fire-resistant properties;

said joint being constituted in such a manner that when the corrugated tube is inserted into the joint, the resistance generated when the peak section at the front end of the corrugated tube confronts the projection can be transmitted to the operator inserting the corrugated tube, and when the tube is subsequently inserted further, the peak section at the front end of the corrugated tube pushes the projection aside elastically, passes inside same, and enters inside the section having fire-resistant properties, whereby the resistance caused by the peak section confronting said projection ceases, hence allowing the operator to perceive that the corrugated tube has been inserted to a prescribed position.

11. A joint according to claim 1, wherein the seal member has a large diameter section along the internal circumference of the end portion of the tubular main body toward the opening side, the section having a diameter larger than that of the internal circumferential section of the seal member, and the large diameter section and the internal circumferential section are connected to each other by a tapered section.

12. A joint according to claim 1, wherein an internal circumferential surface for restricting inclination of the corrugated tube when it is inserted into the fastening ring is formed on the inner circumference of the fastening ring.

13. A joint according to claim 12, wherein the internal circumferential surface has a length of one pitch or more of the waveform of the corrugated tube in the axial direction of the fastening ring.

14. A joint according to claim 12, wherein a tapered surface for correcting the inserted corrugated tube to a perfect circular shape is formed on the inner circumference of the fastening ring, on the open side thereof from the internal circumferential surface.

15. A joint according to claim 1, wherein a washer is provided between the retainer and the seal member.

16. A joint according to claim 1, wherein a screw section for connecting said joint to a body to be connected is formed in the tubular main body, a hexagonal section which can be engaged by a tool, such as a spanner, in order to screw in this screw section, is formed on the outer circumference of said tubular main body, and the outer circumference of the fastening ring is formed in a circular shape in such a manner that it cannot be engaged by a tool, such as a spanner.

17. A joint according to claim 16, wherein the corrugated tube of the flexible tube is covered by a covering member made from resin, and packing is provided between the end face of the tubular main body and the end face of the base portion of the fastening ring, the front end portion of which is screwed into the tubular main body, in order that gas which may infiltrate inside said joint via gaps between the covering member and the corrugated tube after leaking from the corrugated tube in the flexible tube is able to escape outside the joint.

18. A retainer used in a joint for a flexible tube composed of a corrugated tube, wherein said joint comprises: a tubular main body; a fastening ring, the front end portion of which screws inside said tubular main body, a tapered surface expanding in diameter towards the front end thereof being formed on the inner circumference of the fastening ring; and a ring-shaped seal member provided inside said tubular main body;

the corrugated tube comprising a plurality of peak sections and valley sections, can be inserted from the end portion of the fastening ring to the inside of the fastening ring and the inside of the retainer and seal member provided in said tubular main body; and said retainer comprising an end face which is formed in a radial direction at one end of the retainer; a tapered face gradually reducing in diameter towards said end face, formed on the inner circumference of said retainer; projections formed by the intersection of the tapered face and the end face to project obliquely inward in the radial direction of the retainer; an outer circumferential surface capable of contacting the tapered surface on the inner side of said fastening ring, formed at the other end of the retainer; incisions formed in an axial direction from said one end towards said other end, in a plurality of positions along the circumference of the retainer; and a thin section, formed continuously in the circumferential direction at the other end of the retainer, for the purpose of allowing deformation whereby the projections are pushed open. elastically by a peak section of the corrugated tube when the corrugated tube is inserted into the retainer, and the projections engage with a valley section of the corrugated tube when the peak section has passed.

19. A ring-shaped seal member used in a joint for a flexible tube composed of a corrugated tube, wherein said joint comprises: a nebular main body; a fastening ring, the front end portion of which screws inside said tubular main body; and a seal member receiving section, formed in the tubular main body, which is open to the open side of the tubular main body, in such a manner that the seal member can be installed via the open side of the tubular main body;

the corrugated tube in said flexible tube, said corrugated tube comprising a plurality of peak sections and valley sections, can be inserted from the end portion of the fastening ring to the inside of the fastening ring and the inside of the retainer and seal member provided in said tubular main body;

said seal member comprises a section having fire-resistant properties located to the rear side of the tubular main body in the receiving section, and a section not having fire-resistant properties located to the open side of the tubular main body in the receiving section, said sections of the seal member being formed into an integrated body; and said seal member comprises, as an indicator for distinguishing the portion thereof to be located towards the rear side of the tubular main body in the receiving section and the portion thereof to be located towards the open side of the tubular main body in the receiving section at least one of either a first round section or chamfered section formed on the outer circumferential edge of the section having fire-resistant properties, and/or a second round section or chamfered section formed on the inner circumferential edge of the section not haying fire-resistant properties.

20. A seal member according to claim 19, wherein the material having fire-resistant properties is formed from a fire-resistant rubber containing thermally expansive graphite.

21. A seal member according to claim 19, wherein the internal diameter of the section having fire-resistant properties is larger than the internal diameter of the section not having fire-resistant properties, at the stage prior to insertion of the corrugated tube.

22. A seal member according to claim 19, wherein the outer circumference of the section having fire-resistant properties is formed with a tapered shape which reduces in diameter towards the front end thereof.

23. A seal member according to claim 19, wherein an inward-orientated projection is formed in the section not having fire-resistant properties; said projection being constituted in such a manner that when the corrugated tube is inserted into the joint, the resistance generated when the peak section at the front end of the corrugated tube confronts the projecting section can be transmitted to the operator inserting the corrugated tube, and when the tube is subsequently inserted further, the peak section at the front end of the corrugated tube pushes the projection aside elastically, passes inside same, and enters inside the section having fire-resistant properties, whereby the resistance caused by the peak section confronting the projection ceases, hence allowing the operator to perceive that the corrugated tube has been inserted to a prescribed position.

24. A seal member according to claim 19, wherein a large diameter section is formed along the internal circumference of the opening-end portion of the section not having fire-resistant properties, the large diameter section having a diameter larger than that of the internal circumference of the section not having fire-resistant properties, and the large diameter section and the internal circumferential section are connected to each other by the second chamfered section.

25. A method for connecting a joint for a flexible tube composed of a corrugated tube to a body to be connected by screwing said joint into said body;

wherein said joint comprises a tubular main body which can be screwed into and fixed to the body to be connected, and a fastening ring which screws into and fixes to the tubular main body and is formed, on the inner circumference thereof, with a tapered surface expanding in diameter towards the front end thereof;

the corrugated tube in said flexible tube can be inserted from the end portion of the fastening ring to the inside of the fastening ring and the tubular main body;

a ring-shaped retainer is located to the inner side of the tapered surface of the fastening ring;

the retainer comprising projections which project in inward redial directions; and an outer circumferential surface capable of contacting the tapered surface on the inner side of said fastening ring; said retainer being formed in such manner that the retainer can be pushed open elastically by the peak section of the corrugated tube when the corrugated tube is inserted into the retainer and can be deformed to engage the projections with the valley section of the corrugated tube when the peak section has passed; and said tubular main body comprises a ring-shaped projecting section formed in the tubular main body to the inner side of the seal member, in such a manner that it extends from the front end opening of the corrugated tube inserted inside the seal member into the end portion of the corrugated tube;

a ring-shaped seal member for sealing the outer circumference of the portion of the corrugated tube which has passed the projections in the retainer is located inside the tubular main body; and in said method, the tubular main body is screwed into the body to be connected by rotating the tubular main body and the fastening ring relatively with respect to the flexible tube, in a state where the projections in the retainer have engaged with a valley section of the corrugated tube by means of the insertion of the flexible tube.

26. A joint for a flexible tube composed of a corrugated tube, comprising a tubular main body; a fastening ring, the front end portion of which connects to said tubular main body; and a retainer provided inside the tubular main body in the vicinity of the front end portion of the fastening ring;

wherein said flexible tube is constituted in such a manner that it can be connected in a fashion to said joint, by inserting the corrugated tube via the end portion of the fastening ring into the fastening ring, retainer and tubular main body; and an indicator representing references for marking the flexible tube is formed on said tubular main body, in a position corresponding to the length of the front end portion of the flexible tube that is to be inserted inside the fastening ring, retainer and tubular main body.

27. A joint according to claim 26, wherein a screw section for connecting the joint to a body to be connected is formed in the tubular main body, a hexagonal section capable of being engaged by a tool, such as a spanner, in order to screw in the screw section, is formed on the outer surface of the tubular main body, and the end of this hexagonal section and the end face of the fastening ring are used as the indicator.

* * * * *